United States Patent
Fujikawa et al.

Patent Number: 6,091,470
Date of Patent: Jul. 18, 2000

[54] ACTIVE MATRIX SUBSTRATE WITH CONCAVE PORTION IN REGION AT EDGE OF PIXEL ELECTRODE AND METHOD FOR FABRICATING THE SAME USING ASHING TREATMENT

[75] Inventors: Takashi Fujikawa, Tenri; Yoshiharu Kataoka, Suita, both of Japan

[73] Assignee: Sharp Kabushiki Kaisha, Osaka, Japan

[21] Appl. No.: 08/926,574

[22] Filed: Sep. 4, 1997

[30] Foreign Application Priority Data

Oct. 4, 1996 [JP] Japan ................................. 8-264201

[51] Int. Cl.⁷ .................................................. G02F 1/1333
[52] U.S. Cl. ............................. 349/122; 438/700; 438/30
[58] Field of Search .................................. 349/41, 43, 47, 349/122, 138, 30; 757/57, 72, 752; 438/700, 725

[56] References Cited

U.S. PATENT DOCUMENTS

| | | |
|---|---|---|
| 5,585,951 | 12/1996 | Noda et al. |
| 5,641,974 | 6/1997 | den Boer et al. |
| 5,847,410 | 12/1998 | Nakajima ................................. 257/59 |
| 5,940,151 | 8/1999 | Ha ............................................. 349/43 |

FOREIGN PATENT DOCUMENTS 7-20497  1/1995  Japan .

*Primary Examiner*—Kenneth Parker
*Attorney, Agent, or Firm*—Nixon & Vanderhye P.C.

[57] ABSTRACT

An active-matrix substrate includes: two kinds of lines arranged in a matrix on an insulating plate; switching elements each provided in the vicinity of an intersection of the two kinds of lines; an insulating film for flattening, covering an entire surface of the insulating plate so as to flatten the uneven surface of the insulating plate due to the presence of the lines and the switching elements; and pixel electrodes provided in a matrix on the insulating film for flattening. A concave portion for preventing a short-circuit from occurring between the pixel electrodes during a production process is formed in a region of the insulating film for flattening which corresponds to a gap between pixel electrodes which are adjacent to each other. Also, a method for fabricating the active-matrix substrate includes the step of forming a concave portion for preventing a short-circuit from occurring between the pixel electrodes in an exposed portion of the insulating film for flattening at a gap between the pixel electrodes adjacent to each other, forming the concave portion by an ashing treatment after forming the pixel electrodes in a matrix.

10 Claims, 5 Drawing Sheets

ACTIVE MATRIX SUBSTRATE WITH CONCAVE PORTION IN REGION AT EDGE OF PIXEL ELECTRODE AND METHOD FOR FABRICATING THE SAME USING ASHING TREATMENT

BACKGROUND OF THE INVENTION

1. Field of the Invention

The present invention relates to an active-matrix substrate constituting a liquid crystal display panel (hereinafter, referred to as an LCD panel) and a method for producing the same. More specifically, the present invention relates to an active-matrix substrate in which the uneven surface of an insulating plate due to the presence of lines and switching elements is flattened by an insulating film for flattening and pixel electrodes are provided on the flattened surface; and a method for producing the same.

2. Description of the Related Art

An LCD panel generally has a structure in which two substrates are provided so as to face each other with a required space interposed therebetween and liquid crystals are injected into the space. One of the two substrates is an active-matrix substrate and the other substrate is a counter substrate. The counter substrate can include color filters of red, green and blue, or color filters of yellow, magenta and cyan.

Figure 6:
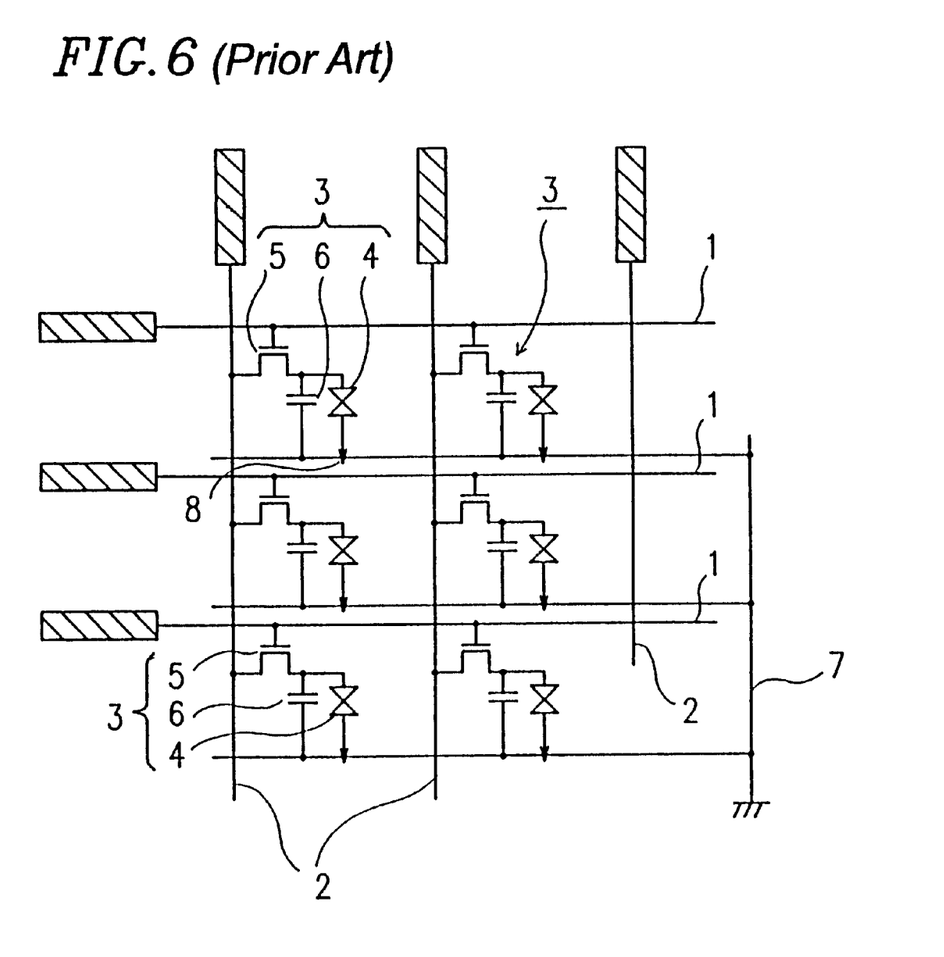
FIG. 6 is a circuit diagram showing a configuration of a typical LCD panel.

FIG. 6 is a circuit diagram showing the configuration of a typical LCD panel. As shown in FIG. 6, a plurality of gate bus lines 1 are arranged in a row direction as scanning lines, and a plurality of source bus lines 2 are arranged in a column direction as signal lines. A plurality of pixels 3 are provided in matrix-shaped regions formed by the orthogonal crossing of the gate bus lines 1 and the source bus lines 2. Each of the pixels 3 includes a pixel electrode 4 and a switching element 5 such as a thin-film transistor (hereinafter referred to as a TFT). The pixel 3 can include a storage capacitor 6 if necessary. A storage capacitor bus line 7 and common electrodes 8 are also shown in FIG. 6.

The plurality of gate bus lines 1, the plurality of source bus lines 2 and the pixels 3 are provided on an active-matrix substrate, and the common electrodes 8 are provided on a counter substrate.

In order to realize a high aperture ratio and high precision micro-processing in the above-described active-matrix substrate, it has been suggested that an unevenness on the surface of an insulating plate, which is caused by the gate bus lines 1, the source bus lines 2 and the switching elements 5, is eliminated by an insulating film for flattening. Then the pixel electrodes 4 may be provided in a matrix on the flattened surface.

In the active-matrix substrate having the above-described structure, a rubbing treatment is conducted after the pixel electrodes 4 are formed. In the case where foreign material attaches to a portion of the insulating film in a gap between the pixel electrodes 4 when moving into the rubbing treatment step, the pixel electrodes 4 may be short-circuited with each other. Also, in the case where an edge of the pixel electrode 4 is chipped during the rubbing treatment and the chipped edge is attached to a portion in the gap between the pixel electrodes 4, the pixel electrodes 4 may be short-circuited with each other. Or, in the case where a resist mask is inaccurately formed due to the attachment of dust or the like during the formation of the resist mask in the patterning process of the pixel electrodes 4, etch residue may remain, thereby causing the pixel electrodes 4 to be short-circuited with each other. In this case, the structural defect may be corrected, for example, by removing the short-circuited portion by laser radiation. However, this requires excess time and cost.

Although its intention is not to solve the problems described above, Japanese Laid-Open Patent Publication No. 7-20497 suggests an active matrix substrate wherein a concave portion along the circumference of each of the pixel electrodes is formed in an insulating film for flattening, and liquid crystal pixels are functionally separated from one another by coercively controlling a pretilt angle of the liquid crystal molecules.

This concave portion is formed by etching the insulating film for flattening, using a photolithography technique with a resist used as a mask. The etching is performed before the formation of the pixel electrodes.

The pixel electrodes are formed as follows. A conductive film is formed on the entire top surface of the insulating film for flattening including the above-described concave portions. Then, etching is performed by a photolithography technique with a resist used as a mask.

According to this active-matrix substrate, however, the concave portion and the pixel electrodes are formed by different photolithography techniques. As a result, the number of production steps is increased and the production cost is thus increased. Also, since the pixel electrodes are formed after the formation of the concave portion in the insulating film for flattening, the number of mask alignments is increased and thus, accuracy with respect to the formation position of the pixel electrodes is deteriorated.

SUMMARY OF THE INVENTION

According to one aspect of this invention, an active-matrix substrate includes: two kinds of lines arranged in a matrix on an insulating plate; switching elements each provided in the vicinity of an intersection of the two kinds of lines; an insulating film for flattening, covering an entire surface of the insulating plate so as to flatten the uneven surface of the insulating plate due to the presence of the lines and the switching elements; and pixel electrodes provided in a matrix on the insulating film for flattening. A concave portion for preventing a short-circuit from occurring between the pixel electrodes during a production process is formed in a region of the insulating film for flattening which corresponds to a gap between pixel electrodes which are adjacent to each other.

In one embodiment of the present invention, a depth of the concave portion is about 0.1 to about 1.0 $\mu$m.

According to another aspect of this invention, an active-matrix substrate includes: two kinds of lines arranged in a matrix on an insulating plate; switching elements each provided in the vicinity of an intersection of the two kinds of lines; an insulating film for flattening, covering an entire surface of the insulating plate so as to flatten the uneven surface of the insulating plate due to the presence of the lines and the switching elements; and pixel electrodes provided in a matrix on the insulating film for flattening. A method for fabricating the active-matrix substrate includes the step of forming a concave portion for preventing a short-circuit from occurring between the pixel electrodes in an exposed portion of the insulating film for flattening at a gap between the pixel electrodes adjacent to each other, forming the concave portion by an ashing treatment after forming the pixel electrodes in a matrix.

In one embodiment of the present invention, the step of forming the concave portion for preventing a short-circuit from occurring between the pixel electrodes by an ashing treatment is conducted using the pixel electrode as a mask.

In another embodiment of the present invention, the step of forming the concave portion for preventing a short-circuit from occurring between the pixel electrodes by an ashing treatment is conducted using a resist in a process of forming the pixel electrodes as a mask.

In still another embodiment of the present invention, a depth of the concave portion is about 0.1 to about 1.0 μm.

According to still another aspect of this invention, an active-matrix substrate includes: two kinds of lines arranged in a matrix on an insulating plate; switching elements each provided in the vicinity of an intersection of the two kinds of lines; an insulating film for flattening, covering an entire surface of the insulating plate so as to flatten the uneven surface of the insulating plate due to the presence of the lines and the switching elements; and pixel electrodes provided in a matrix on the insulating film for flattening. A method for fabricating the active-matrix substrate includes the steps of: forming the insulating film for flattening and then providing a conductive film for obtaining the pixel electrode on the entire flat surface; forming a resist with a required pattern on a surface of the conductive film; etching the conductive film using the resist as a mask so as to form the pixel electrodes in a matrix; removing the resist; and performing an ashing treatment of the insulating film for flattening using the pixel electrode as a mask so that a concave portion with a required depth is formed in an exposed portion of the insulating film for flattening at a gap between the pixel electrodes adjacent to each other.

In one embodiment of the present invention, a depth of the concave portion is about 0.1 to about 1.0 μm.

According to still yet another aspect of this invention, an active-matrix substrate includes: two kinds of lines arranged in a matrix on an insulating plate; switching elements each provided in the vicinity of an intersection of the two kinds of lines; an insulating film for flattening, covering an entire surface of the insulating plate so as to flatten the uneven surface of the insulating plate due to the presence of the lines and the switching elements; and pixel electrodes provided in a matrix on the insulating film for flattening. A method for fabricating the active-matrix substrate includes the steps of: forming the insulating film for flattening and then providing a conductive film for obtaining the pixel electrode on the entire flat surface; forming a resist with a required pattern on a surface of the conductive film; etching the conductive film using the resist as a mask so as to form the pixel electrodes in a matrix; and performing an ashing treatment of the insulating film for flattening using the resist as a mask so that a concave portion with a required depth is formed in an exposed portion of the insulating film for flattening at a gap between the pixel electrodes adjacent to each other, and the resist is removed.

In one embodiment of the present invention, a depth of the concave portion is about 0.1 to about 1.0 μm.

According to the present invention, after the pixel electrodes are formed on the flat surface of the insulating film for flattening, an ashing treatment is performed for the exposed portion of the insulating film for flattening at the gap between the pixel electrodes so as to form a concave portion. Therefore, as compared to a conventional method, a reduced number of production steps can be realized and the pixel electrode and the concave portion can be formed with high accuracy.

Also, by forming the concave portion in the insulating film for flattening, a distance between the bottom of the concave portion and the pixel electrode is increased. As a result, even when conductive foreign material attaches to a portion at the gap between the pixel electrodes, for example, during a rubbing treatment, this foreign material falls into the concave portion, thereby preventing the pixel electrodes from being short-circuited with each other. Additionally, even when etch residue is generated due to defective patterning in the patterning process of the pixel electrodes in such a way that the pixel electrodes are short-circuited with each other, the etch residue is removed by a phenomenon similar to lift-off during the formation process of the concave portion in the insulating film for flattening. As a result, the pixel electrodes are separated from one another with certainty.

Thus, according to the present invention, the occurrence rate of a structural defect (for example, a short-circuit occurring between the two adjacent pixel electrodes) can be significantly reduced, and accuracy with respect to the formation position of the pixel electrodes can be improved. As a result, the rate of non-defective products can be improved and the production cost can be reduced. Also, since correction of a structural defect, which is required in a conventional active-matrix substrate, is unnecessary, the present invention can contribute to a reduction in the overall cost.

Thus, the invention described herein makes possible the advantage of providing a high-quality active-matrix substrate at low cost.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described based on one embodiment shown in FIGS. 1 to 5.

Figure 1:
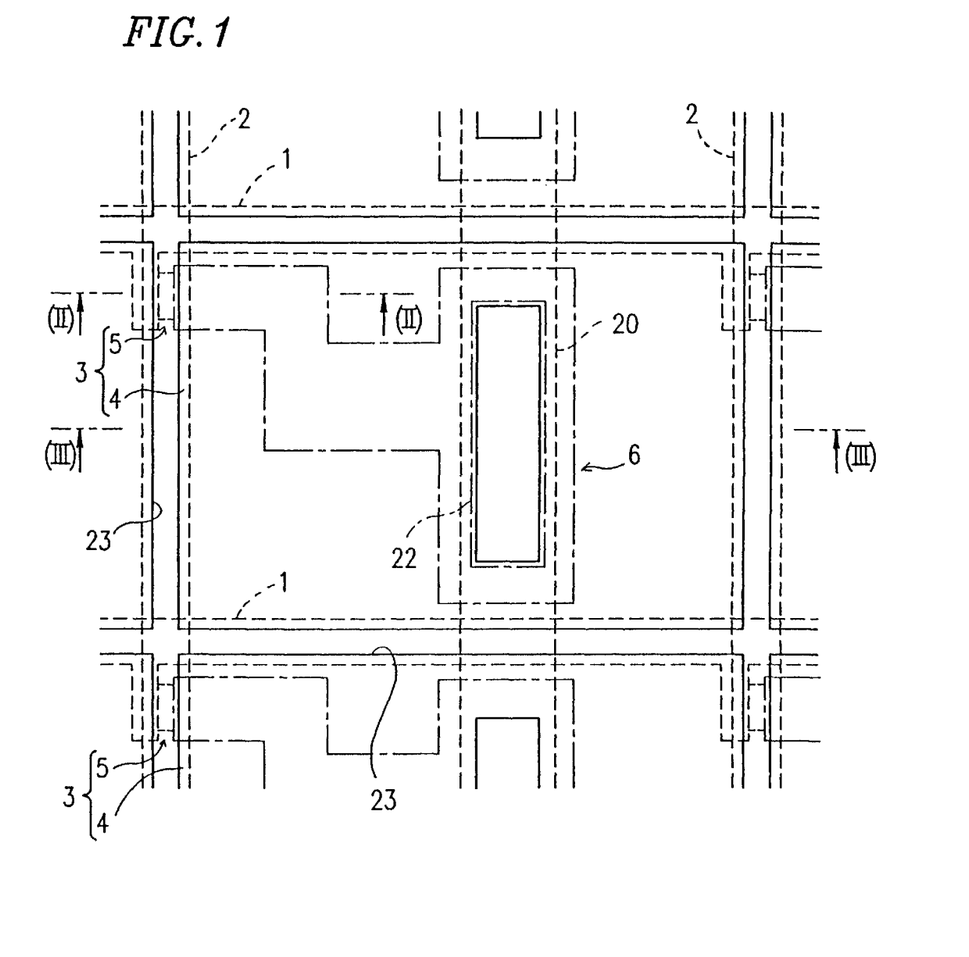
FIG. 1 is a schematic plan view showing a pixel of an active-matrix substrate according to one embodiment of the present invention.
Figure 2:
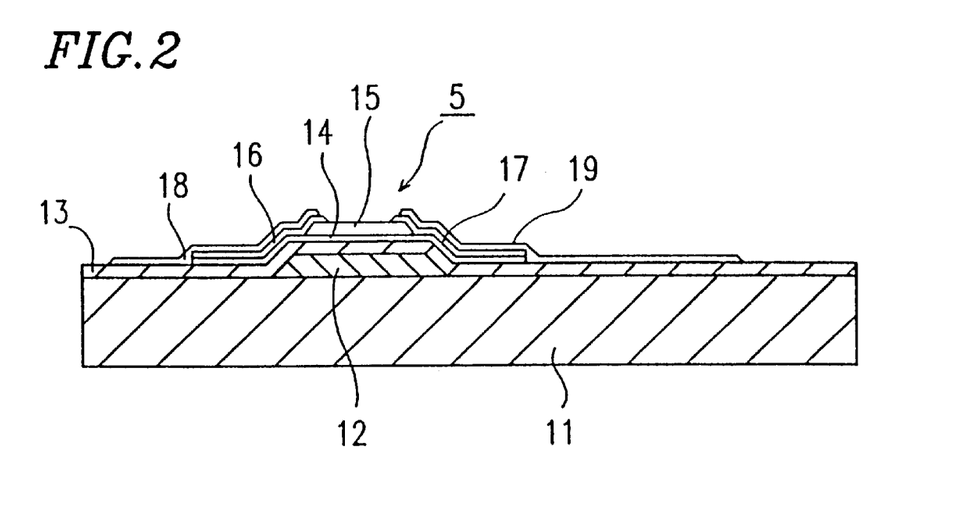
FIG. 2 is a cross-sectional view of the active-matrix substrate taken along line II—II in FIG. 1.
Figure 3:
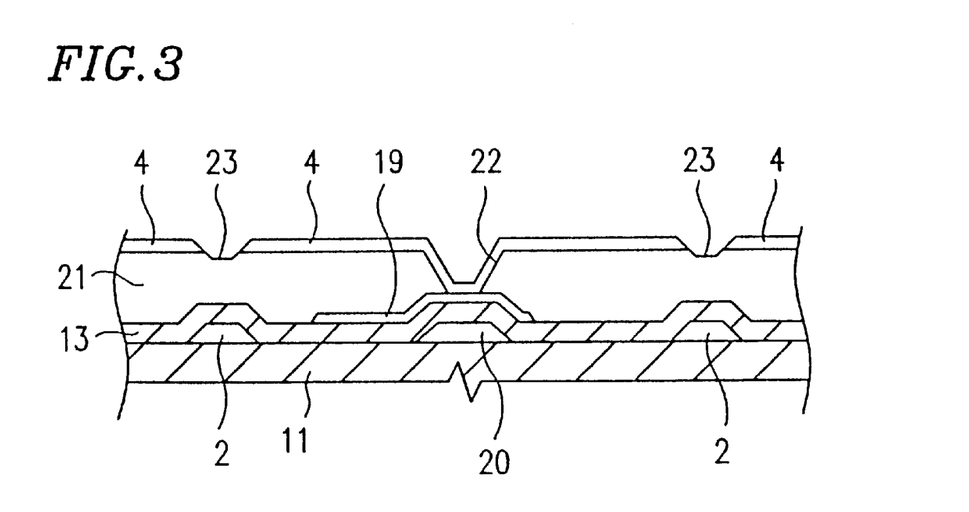
FIG. 3 is cross-sectional view of the active-matrix substrate taken along line III—III in FIG. 1.

FIGS. 1 to 4 relate to one embodiment of the present invention. FIG. 1 is a schematic plan view showing a pixel of an active-matrix substrate according to one embodiment of the present invention. FIG. 2 is a cross-sectional view showing the active-matrix substrate taken along line II—II in FIG. 1, and FIG. 3 is a cross-sectional view showing the active-matrix substrate taken along line III—III in FIG. 1. FIGS. 4A to 4E are cross-sectional views of the active-matrix substrates taken along line III—III in FIG. 1, each showing a production step of the active-matrix substrate in FIG. 1.

The active-matrix substrate as shown in FIG. 1 includes the gate bus lines 1, the source bus lines 2, the pixels 3 and the storage capacitors 6 (also shown in FIG. 6) provided on the surface of a transparent insulating plate 11 (not shown). Each of the pixels 3 includes a pixel electrode 4 and a switching element 5. In this active-matrix substrate, the uneven surface of the insulating plate 11 due to the presence of the gate bus lines 1, the source bus lines 2, the switching elements 5, and the like is flattened or a flat surface is provided by an insulating film 21 for flattening (not shown) and the pixel electrodes 4 are provided in a matrix on the flattened surface. As a result, the active-matrix substrate has a high aperture ratio and high precision micro-processing.

As shown in FIG. 2, the switching element 5 is a TFT having an inverted staggered structure. The switching element 5 includes: a gate electrode 12, a gate insulating film 13, a semiconductor layer 14, a channel protecting layer 15, ohmic contact layers 16 and 17, a source electrode 18 and a drain electrode 19. The gate bus line 1 (not shown) is connected to the gate electrode 12, and the source bus line 2 (not shown) is connected to the source electrode 18. As shown in FIG. 3, the pixel electrode 4 is connected to the drain electrode 19 via a contact hole 22 provided in the insulating film 21 for flattening.

Although not shown in FIG. 3, the storage capacitor 6 has a three-layered structure, i.e., layers of the drain electrode 19, the gate insulating film 13 and a conductive film 20 for the storage capacitor. This storage capacitor 6 is formed by overlapping the conductive film 20 for the storage capacitor and the drain electrode 19 (i.e., the storage capacitor 6 has a so-called Cs-on-Common structure).

A concave portion 23 is provided in a portion of the insulating film 21 for flattening, corresponding to a gap between two adjacent pixel electrodes 4.

The thus configured active-matrix substrate has an increased distance between the bottom of the concave portion 23 at the gap between the pixel electrodes 4 and the pixel electrode 4. As a result, even when attachment of conductive foreign material occurs at a portion of the gap between the pixel electrodes 4 during a rubbing treatment, the foreign material falls into the concave portion 23, thereby preventing the pixel electrodes 4 from being short-circuited with each other. Or, even when etch residue is generated due to defective patterning of the pixel electrode 4 in such a way that the pixel electrodes 4 are short-circuited with each other, the etch residue is removed by a phenomenon similar to lift-off during the process where the concave portion 23 is formed in the insulating film 21 for flattening. As a result, the pixel electrodes 4 are separated from one another with certainty.

Next, a method for producing the active-matrix substrate having the above-described configuration will be described with reference to FIGS. 4A to 4E.

Figure 4A:
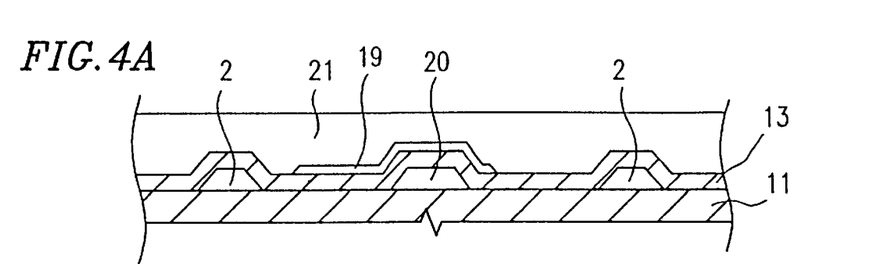
FIGS. 4A to 4E are cross-sectional views of the active-matrix substrates taken along line III—III in FIG. 1, each showing a production step of the active-matrix substrate in FIG. 1.

(1) A conductive film with a thickness of about 300 nm is formed by sputtering on the top surface of the transparent insulating plate 11 such as a glass plate. Next, the conductive film is patterned by photolithography so as to form the gate electrodes 12 (not shown), the gate bus lines 1 (not shown) and the storage capacitor bus lines 7 (not shown). Examples of a material for the conductive film include tantalum, titanium, molybdenum, aluminum, copper, ITO (Indium Tin Oxide), and polysilicon doped with impurity ions. An anodic oxide film for compensation may be formed on the surface of the gate electrode 12 using an anodic oxidation method.

(2) A chemical vapor deposition (CVD) method is employed so as to sequentially provide an insulating film constituting the gate insulating film 13, an amorphous silicon layer constituting the semiconductor layer 14 (not shown) and a $SiN_x$ layer constituting the channel protecting layer 15 (not shown) on the entire top surface of the insulating plate 11. The thicknesses of those three layers are about 300 nm, 50 nm and 20 nm, respectively. Examples of a material for the insulating film 13 include silicon dioxide and silicon nitride. The $SiN_x$ layer (the uppermost layer) is patterned so as to form the channel protecting layer 15 (not shown). The amorphous silicon layer (the intermediate layer) is patterned so as to form the semiconductor layer 14 (not shown).

(3) A conductive film is formed on the entire top surface of the insulating plate 11 by sputtering so as to have a thickness of about 150 nm. Next, the conductive film is patterned so as to form the source electrodes 18 (not shown), the drain electrodes 19 and the source bus lines 2. The conductive film 20 for the storage capacitor is also formed by any conventional method. Examples of a material for the conductive film include ITO, tantalum, titanium, molybdenum, aluminum, copper, and polysilicon doped with impurity ions. The source electrode 18 (not shown) and the drain electrode 19 may be formed with two layers so as to lower the resistance and prevent the lines from breaking.

(4) An acrylic resin is applied to the entire top surface of the insulating plate 11 by spin-coating. Then, the acrylic resin is cured so as to obtain the insulating film 21 for flattening with a thickness of about 2 $\mu$m. As shown in FIG. 4A, the uneven surface of the insulating plate 11 is flattened or leveled by the insulating film 21 for flattening. The method for forming the insulating film 21 is not limited to spin-coating. The insulating film 21 may be formed, for example, by a slot coat method or the like.

Figure 4B:
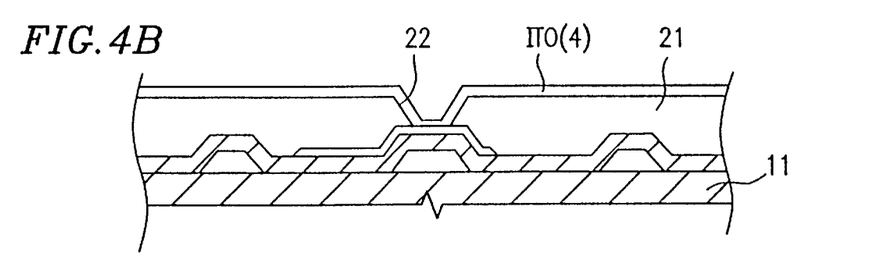
Figure 4C:
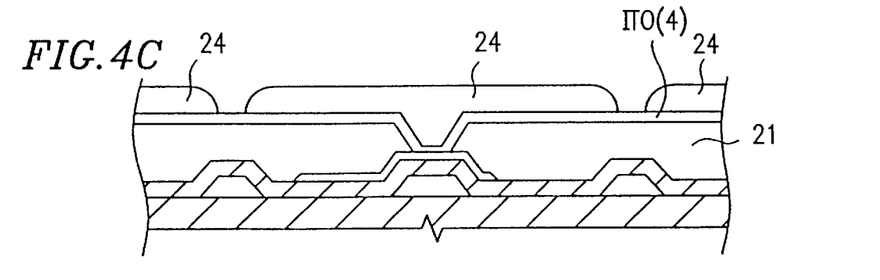
Figure 4D:
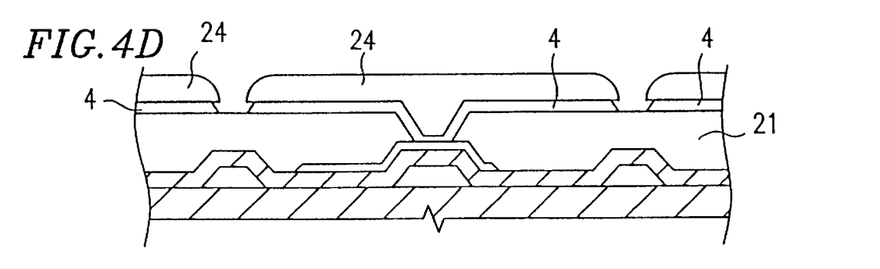

(5) As shown in FIGS. 4B, 4C and 4D, after the contact hole 22 is formed in the insulating film 21 for flattening, an ITO film ITO(4) having a thickness of about 150 nm is formed on the entire top surface of the insulating plate 11 by sputtering. A resist 24 with a required pattern is formed on the surface of the ITO film ITO(4). Then, the patterning of the ITO film ITO(4) is performed by photolithography with the resist 24 used as a mask. In this manner, the pixel electrodes 4 arranged in a matrix are completed. The above-described patterning is conducted by wet-etching.

Figure 4E:
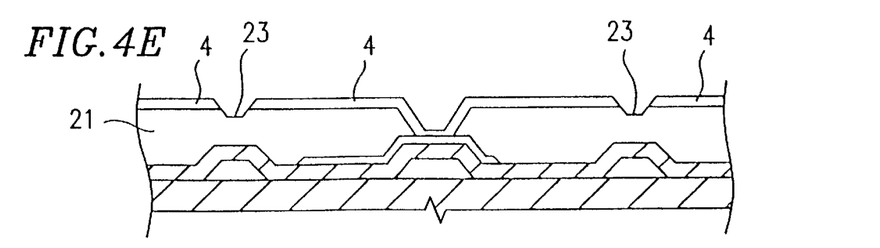
Figure 5A:
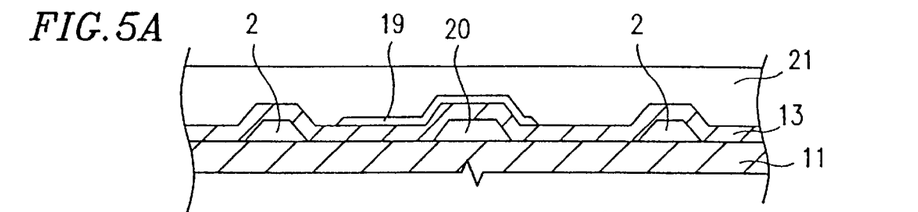
FIGS. 5A to 5F are cross-sectional views of the active-matrix substrates taken along line III—III in FIG. 1, showing another production method of the active-matrix substrate in FIG. 1.
Figure 5B:
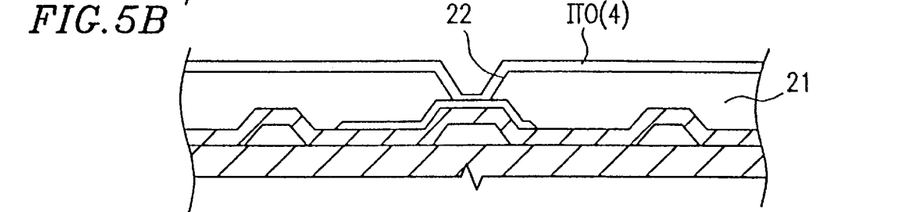
Figure 5C:
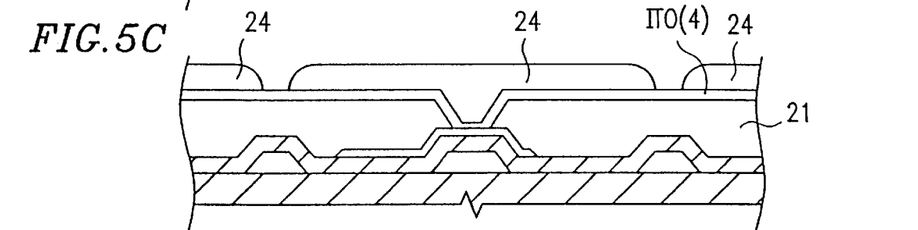
Figure 5D:
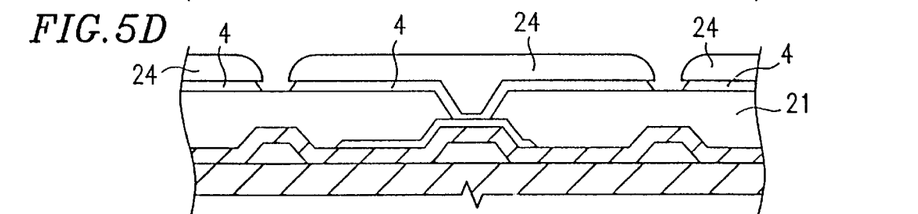
Figure 5E:
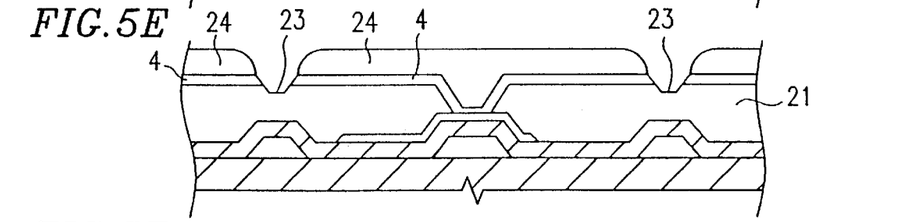
Figure 5F:
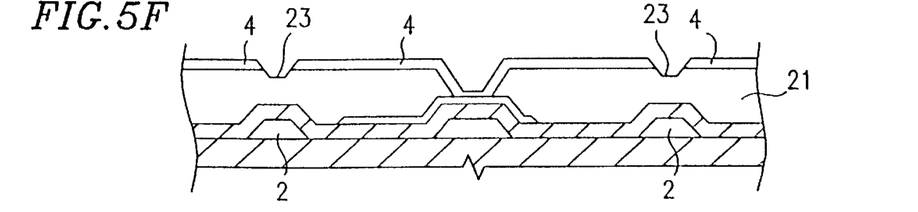

(6) After the removal of the resist 24 in (5), an ashing treatment is conducted with the above-described patterned pixel electrode 4 used as a mask so that the concave portion 23 is formed in the exposed portion of the insulating film 21 for flattening at the gap between adjacent pixel electrodes 4 (see FIG. 4E). The ashing treatment is conducted by placing the insulating plate 11 in an oxygen plasma atmosphere for several minutes. The depth of the concave portion 23 is set to be in the range of, for example, about 0.1 to about 1.0 $\mu$m. When the depth of the concave portion 23 is too large, an uniform alignment film is difficult to obtain in the rubbing treatment to be performed later. This ashing treatment has no effect on the pixel electrode 4 formed of ITO and damage to the pixel electrode 4 cannot be caused.

In the manner described above, the active-matrix substrate according to the present invention is obtained.

Thereafter, the thus obtained active-matrix substrate is rubbed if necessary so as to form an alignment film. Then, the active-matrix substrate is attached to a counter substrate (not shown) and a liquid crystal material is injected into the space between the two substrates. In this manner, an LCD panel is completed.

Thus, according to the present invention, the patterning for forming the concave portion 23 in the insulating film 21 for flattening is completed simply by conducting the ashing treatment in connection with the patterning step of the pixel electrode 4. Therefore, compared to a conventional method in which those patterns are formed by different photolithography techniques, the active-matrix substrate according to the present invention has a significantly reduced number of production steps, and the mask alignment accuracy is prevented from decreasing. As a result, the present invention can realize a reduction in the occurrence rate of a structural defect and thus can contribute to an improvement in the rate of non-defective products.

According to the present invention, the concave portion 23 is formed in the insulating film 21 for flattening so that the distance between the bottom of the concave portion 23 at the gap between the pixel electrodes 4 and the pixel electrode 4 is increased. As a result, even when a conductive foreign material is attached to a portion of the gap between the pixel electrodes 4, for example, during a rubbing treatment conducted after the production of the active-matrix substrate, the foreign material falls into the concave portion 23, thereby preventing the pixel electrodes 4 from being short-circuited with each other. Or, since the above-described step (5) and step (6) are conducted at different places, a microscopic foreign material could be attached to a portion of the gap between the adjacent two pixel electrodes 4 during the transfer. In this case, the foreign material is removed by the ashing treatment in the above-described step (6). Also, even when defective patterning is caused due to an inappropriate reproduction of the resist mask 24 and etch residue is thus generated in such a way that the pixel electrodes 4 are short-circuited with each other, the etch residue is removed by a phenomenon similar to lift-off during the formation process of the concave portion 23 in the insulating film 21 for flattening in the above-described step (6). As a result, the pixel electrodes 4 are separated from one another with certainty.

The present invention is not limited to the example described above, and various other applications and modifications as described below can be made.

In the above-described example, a TFT having an inverted staggered structure using amorphous silicon is employed as the switching element 5. However, the switching element 5 may be a TFT employing polysilicon or single crystal silicon. Also, the TFT may have a staggered or a planar structure. Two-terminal type switching elements such as a varistor or a diode may be employed.

The above-described active-matrix substrate is used to make an LCD panel. This LCD panel can employ any one of display modes including a twisted nematic mode, an electrically controlled birefringence mode, a guest-host mode and the other various modes.

The above-described production method illustrates one general method for producing the active-matrix substrate. The present invention, however, is not specifically limited thereto. For example, as shown in FIGS. 5A to 5F, the production steps (1) to (4) are the same as the steps shown and described with respect to FIGS. 4A to 4E. After the formation of the pixel electrode 4 in step (5), without removing the resist 24 in step (6), the ashing treatment may be conducted with the resist 24 used as a mask so as to form the concave portion 23 in the insulating film 21 for flattening. More specifically, the ashing treatment for the entire surface of the insulating plate 11 causes the resist 24 to be ashed and removed at a portion where the resist 24 exists. At the exposed portion of the insulating film 21 where the resist 24 does not exist, the insulating film 21 for flattening is ashed and removed for a required depth to form the concave portion 23. In this case, since the formation of the concave portion 23 and the removal of the resist 24 can be performed at the same time, the number of production steps can be reduced as compared to that in the above-described example.

The above-described example illustrates a so-called Cs-on-Common structure in which the storage capacitor 6 is formed by overlapping the conductive film 20 for the storage capacitor and the drain electrode 19. However, the present invention can be applied to a so-called Cs-on-Gate structure in which the storage capacitor 6 is formed between the adjacent gate bus line 1 and drain electrode 19.

EXAMPLES

Hereinafter, the present invention will be described by way of illustrative, but non-limiting examples.

Example 1

Hereinafter, a method for fabricating an active-matrix substrate according to Example 1 of the present invention will be described with reference to FIGS. 4A to 4E.

A conductive film such as tantalum, titanium, molybdenum, aluminum, copper, ITO, and polysilicon doped with impurity ions is formed by sputtering on the transparent insulating plate 11 such as a glass plate. The conductive film is formed so as to have a thickness of about 300 nm. Next, the conductive film is patterned by photolithography so as to form the gate electrode 12 (not shown), the gate bus line 1 (not shown) and the storage capacitor bus line 7 (not shown).

A CVD method is employed so as to sequentially provide an insulating film (such as silicon dioxide or silicon nitride) constituting the gate insulating film 13, an amorphous silicon layer constituting the semiconductor layer 14 (not shown) and the $SiN_x$ layer constituting the channel protecting layer 15 (not shown) on the entire top surface of the insulating plate 11. The thicknesses of those three layers are about 300 nm, 50 nm and 20 nm, respectively. The $SiN_x$ layer (the uppermost layer) is patterned so as to form the channel protecting layer 15 (not shown). The amorphous silicon layer (the intermediate layer) is patterned so as to form the semiconductor layer 14 (not shown).

Next, a conductive film such as ITO, tantalum, titanium, molybdenum, aluminum, copper, and polysilicon doped with impurity ions is formed on the entire top surface of the insulating plate 11 by sputtering so as to have a thickness of about 150 nm. Thereafter, the conductive film is patterned so as to form the source electrodes 18 (not shown), the drain electrodes 19 and the source bus lines 2.

Next, an acrylic resin is applied to the entire top surface of the insulating plate 11 by spin-coating. Then, the acrylic resin is cured so as to form the insulating film 21 for flattening with a thickness of about 2 μm.

After the contact hole 22 is formed in the insulating film 21 for flattening, an ITO film ITO(4) having a thickness of about 150 nm is formed on the entire top surface of the insulating plate 11 by sputtering. The resist 24 with a required pattern is formed on the surface of the ITO film ITO(4). Then, the ITO film ITO(4) is patterned by wet etching with the resist 24 used as a mask. In this manner, the pixel electrodes 4 arranged in a matrix are completed.

After the removal of the above-described resist 24, an ashing treatment is conducted by placing the insulating plate 11 in an oxygen plasma atmosphere for several minutes with the above-described patterned pixel electrode 4 used as a mask. The concave portion 23 with a depth of about 0.1 to about 1.0 μm is formed in the exposed portion of the insulating film 21 for flattening at the gap between the pixel electrodes 4. In this manner, the active-matrix substrate according to the present invention is completed.

As described above, according to the present invention, the patterning for forming the concave portion 23 in the insulating film 21 for flattening is completed simply by conducting the ashing treatment in connection with the patterning step of the pixel electrodes 4. Therefore, compared to a conventional method in which those patterns are formed by different photolithography techniques, the number of production steps of the active-matrix substrate according to the present invention is significantly reduced and the mask alignment accuracy is prevented from decreasing.

Example 2

Hereinafter, an active-matrix substrate according to Example 2 of the present invention will be described with reference to FIGS. 5A to 5F.

The active-matrix substrate is fabricated in the same manner as that in Example 1 except for the following point. After the formation of the pixel electrode 4, the resist 24 is not removed and an ashing treatment is conducted with the resist 24 used as a mask so that the concave portion 23 is formed in the insulating film 21 for flattening.

Thus, according to the present invention, the patterning for forming the concave portion 23 in the insulating film 21 for flattening is completed simply by conducting the ashing treatment in connection with the patterning step of the pixel electrode 4. Therefore, compared to a conventional method in which those patterns are formed by different photolithography techniques, the number of the production steps of the active-matrix substrate according to the present invention is significantly reduced and the mask alignment accuracy is prevented from decreasing.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active-matrix substrate, comprising:
   a first group of lines that extends over a second group of lines to form a matrix of lines on an insulating plate;
   switching elements each provided in the vicinity of an intersection of lines from each of said first group and second group of lines;
   an insulating film for flattening, covering an entire surface of the insulating plate so as to flatten the uneven surface of the insulating plate due to the presence of the lines and the switching elements; and
   pixel electrodes provided in a matrix on the insulating film for flattening,
   wherein a concave portion of the insulating film is formed in a gap between pixel electrodes which are adjacent to each other and wherein the concave portion is juxtaposed with edges of the pixel electrodes.

2. An active-matrix substrate according to claim 1, wherein a depth of the concave portion is about 0.1 to about 1.0 μm.

3. A method for fabricating an active-matrix substrate, the active-matrix substrate including:
   a first group of lines that extend over a second group of lines to form a matrix of lines on an insulating plate;
   switching elements each provided in the vicinity of an intersection of lines from each of said first group and second group of lines;
   an insulating film for flattening, covering an entire surface of the insulating plate so as to flatten the uneven surface of the insulating plate due to the presence of the lines and the switching elements, and
   pixel electrodes provided in a matrix on the insulating film for flattening,
   the method comprising the step of forming a concave portion for preventing a short-circuit from occurring between the pixel electrodes in an exposed portion of the insulating film for flattening at a gap between the pixel electrodes adjacent to each other, forming the concave portion by an ashing treatment after forming the pixel electrodes in a matrix.

4. A method for fabricating an active-matrix substrate according to claim 3, wherein the step of forming the concave portion for preventing a short-circuit from occurring between the pixel electrodes by an ashing treatment is conducted using the pixel electrode as a mask.

5. A method for fabricating an active-matrix substrate according to claim 3, wherein the step of forming the concave portion for preventing a short-circuit from occurring between the pixel electrodes by an ashing treatment is conducted using a resist in a process of forming the pixel electrodes as a mask.

6. A method for fabricating an active-matrix substrate according to claim 3, wherein a depth of the concave portion is about 0.1 to about 1.0 μm.

7. A method for fabricating an active-matrix substrate, the active-matrix substrate including:
   a first group of lines that extend over a second group of lines to form a matrix of lines on an insulating plate;
   switching elements each provided in the vicinity of an intersection of lines from each of said first group and second group of lines;
   an insulating film for flattening, covering an entire surface of the insulating plate so as to flatten the uneven surface of the insulating plate due to the presence of the lines and the switching elements, and
   pixel electrodes provided in a matrix on the insulating film for flattening,
   the method comprising the steps of:
      forming the insulating film for flattening and then providing a conductive film for obtaining the pixel electrode on the entire flat surface;
      forming a resist with a required pattern on a surface of the conductive film;
      etching the conductive film using the resist as a mask so as to form the pixel electrodes in a matrix;
      removing the resist; and
      performing an ashing treatment of the insulating film for flattening using the pixel electrode as a mask so that a concave portion with a required depth is formed in an exposed portion of the insulating film for flattening at a gap between the pixel electrodes adjacent to each other.

8. A method for fabricating an active-matrix substrate according to claim 7, wherein a depth of the concave portion is about 0.1 to about 1.0 μm.

9. A method for fabricating an active-matrix substrate, the active-matrix substrate including:
   a first group of lines that extend over a second group of lines to form a matrix of lines on an insulating plate;
   switching elements each provided in the vicinity of an intersection of lines from each of said first group and second group of lines;

an insulating film for flattening, covering an entire surface of the insulating plate so as to flatten the uneven surface of the insulating plate due to the presence of the lines and the switching elements, and pixel electrodes provided in a matrix on the insulating film for flattening, the method comprising the steps of:

forming the insulating film for flattening and then providing a conductive film for obtaining the pixel electrode on the entire flat surface;

forming a resist with a required pattern on a surface of the conductive film;

etching the conductive film using the resist as a mask so as to form the pixel electrodes in a matrix; and performing an ashing treatment of the insulating film for flattening using the resist as a mask so that a concave portion with a required depth is formed in an exposed portion of the insulating film for flattening at a gap between the pixel electrodes adjacent to each other, and the resist is removed.

10. A method for fabricating an active-matrix substrate according to claim 9, wherein a depth of the concave portion is about 0.1 to about 1.0 μm.

* * * * *